United States Patent [19]

Kubota

[11] 3,901,474
[45] Aug. 26, 1975

[54] ROTARY VALVE

[75] Inventor: Yasuna Kubota, Kunitachi, Japan

[73] Assignee: Taimei Kinzoku Kogyo Kabushiki Kaisha, Tokyo, Japan

[22] Filed: Dec. 27, 1973

[21] Appl. No.: 428,771

[52] U.S. Cl. .................. 251/159; 251/81; 251/188
[51] Int. Cl.² ...................................... F16K 25/02
[58] Field of Search .......... 192/184, 12 C; 251/159, 251/77, 81, 188

[56] References Cited
UNITED STATES PATENTS 3,007,490   11/1961   Passmore ................... 251/159 X

*Primary Examiner*—Henry T. Klinksiek
*Attorney, Agent, or Firm*—Stevens, Davis, Miller & Mosher

[57] ABSTRACT

A rotary valve including a movable valve seat which is caused to be pressed against a rotary valve plug when the latter is positioned at its full close position or at its full close and full open positions and to be moved away from said rotary valve plug during the time the latter is being rotated to open or close the valve, by means of a fluid-pressure-means which is automatically actuated by the operation of a driving shaft for rotating said valve plug.

5 Claims, 8 Drawing Figures

3,901,474

ROTARY VALVE

BACKGROUND OF THE INVENTION

The present invention relates to a rotary valve and, more particularly, a rotary valve of the type which includes a movable valve seat made of metal, synthetic resin or like material which is caused to be pressed against a rotary valve plug when the latter is positioned at its full close position or its full close and full open positions and to be moved away from the rotary valve plug during the time the latter is being rotated to open or close the valve, whereby the valve operating torque for opening or closing the valve is substantially reduced and the wear or damage of the valve is minimized.

One type of such a rotary valve which has been heretofore proposed includes a valve seat which can be mechanically actuated by means of an operating lever which is manually operated independently of another operating lever for rotating a rotary valve plug to open or close the valve. That is, this type of the rotary valve employs two separate manual operating levers to actuate the movable valve seat and the rotary valve plug, respectively.

Another type which has been proposed includes a movable valve seat which can be hydraulically actuated by means of fluid pressure means under the control of a change-over valve which serves to control the flow of the fluid pressure medium to move the valve seat into and out of contact with the rotary valve plug. This type of the rotary valve must employ a mechanism for operating the change-over valve, in addition to an operating lever for rotating the rotary valve plug to open or close the valve.

SUMMARY OF THE INVENTION

It is an object of the present invention to provide a rotary valve including a movable valve seat which is simple in operation.

It is a specific object of the present invention to provide a rotary valve including a movable valve seat which employs a single driving means to drive both of a valve plug and the movable seat.

It is another object of the present invention to provide a rotary valve having a movable seat which is simple in construction and which can be manufactured at relatively low cost.

In accordance with the present invention there is provided a rotary valve comprising a valve casing, a rotary valve plug housed in said valve casing and rotatable between its valve opening position and valve closing position, a valve seat movably mounted in said valve casing for movement into and out of engagement with said valve plug, a valve rod connected to said valve plug, a driving shaft for driving said valve rod, a clutch means interposed between said driving shaft and said valve rod which connects said driving shaft to said valve rod during the time said rotary valve plug is rotated between said valve opening and closing positions and permits additional rotation of said driving shaft after said valve plug has stopped rotation and fluid pressure circuit for holding the movable valve seat out of engagement with the valve plug during the rotation thereof and for transmitting said additional rotation of said driving shaft to the movable seat to move it into engagement with said valve plug.

In accordance with an aspect of the present invention there is provided a rotary valve comprising a rotary valve plug housed in said valve casing and rotatable between its valve opening and closing positions, a valve seat movably mounted in said valve casing for movement into and out of engagement with said valve plug, a valve rod connected to said valve plug, a driving shaft for driving said valve rod, a clutch including a driven member fixed on the valve rod and a driving member slidably mounted for axial movement on the driving shaft, means for guiding said driving member to cause it to connect with said driven member during the time the valve plug is rotated between the valve opening and closing positions and to move in axial direction away from said driven member after said valve plug has stopped rotation, a piston integrally formed on said driving member, and fluid pressure circuit for holding the movable seat out of engagement with the valve plug during the rotation thereof and transmitting the axial movement of said piston to the movable seat to move it into engagement with said valve plug.

In accordance with another aspect of the present invention there is provided a rotary valve comprising a valve casing, a rotary valve plug housed in said valve casing and rotatable between its valve opening and closing positions, a valve seat movably mounted in said casing for movement into and out of engagement with said valve plug, a valve rod connected to said valve plug, a driving shaft for driving said valve rod, a clutch including a driven member fixed on the valve rod and a driving member slidably mounted for axial movement on the driving shaft, said clutch permitting additional rotation of the driving member beyond the rotation of the driven member, a cylinder arranged in coaxial relationship around the driving shaft, a piston slidably fitted within said cylinder so as to make only axial sliding movement therein, means for guiding the piston to cause it to move in axial direction during said additional rotation of the driving shaft and fluid pressure circuit for holding the movable seat out of engagement with the valve plug and transmitting the axial movement of said piston to the movable seat to move it into engagement with said valve plug.

BRIEF DESCRIPTION OF THE DRAWINGS

The drawings illustrate the preferred embodiments of the present invention, in which.

DESCRIPTION OF THE PREFERRED EMBODIMENTS

Figure 1:
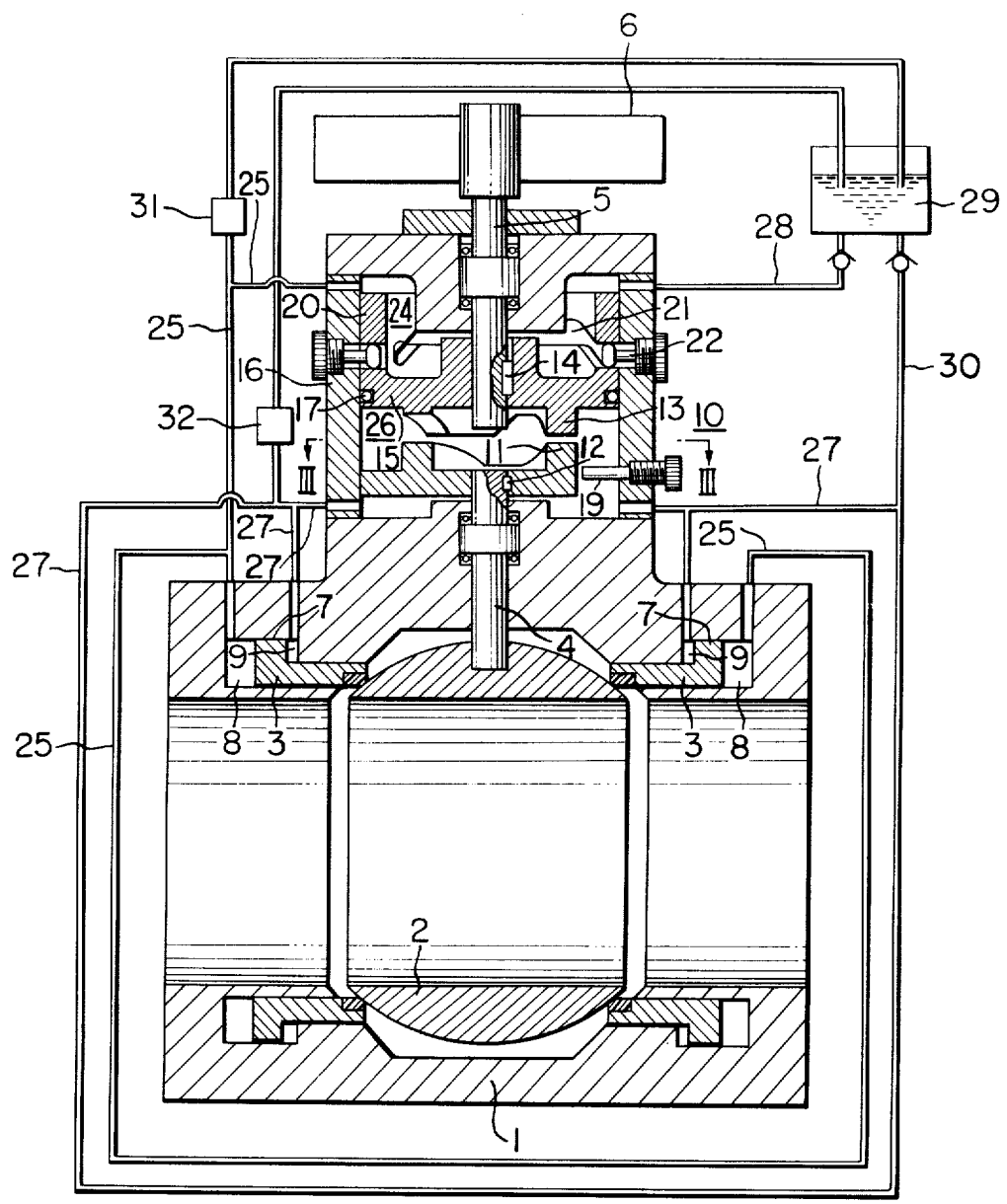
FIG. 1 is a sectional view of the rotary valve according to an embodiment of the present invention.

Referring to the drawings in detail and particularly to FIG. 1, there is shown an embodiment of a rotary valve, which basically comprises a valve casing 1, a rotary valve plug 2, movable valve seats 3, a valve rod 4, a driving shaft 5 and a manual operating lever 6. Each of the movable valve seats 3 is formed with an annular projection 7 which is slidably fitted within a cylinder, and said valve seat is actuated by fluid pressure medium which is supplied into a chamber 8 or 9 of said cylinder so that said movable valve seat is moved away from the valve plug 2 during the opening or closing operation of the valve plug so as to hold said valve seat out of contact with the valve plug or it is pressed into contact with said valve plug during the time the latter is held in its full close position or full close and full open positions.

As shown in FIG. 1, a clutch 10 is disposed between the valve rod 4 connected to the rotary valve plug 2 and the driving shaft 5 for driving said valve rod. The clutch is illustrated as a dog clutch which comprises a driven member 11 fixed on the valve rod 4 by means of a key 12 and a driving member 13 slidably mounted for axial sliding movement on the driving shaft 5 by means of a key 14. The driving member 13 has a piston 15 integrally formed thereon, which is slidably fitted within a cylinder 16. An O-ring 17 is disposed in a peripheral groove formed in the peripheral surface of said piston 15 and makes sealing contact with the inside surface of said cylinder 16.

Figure 3:
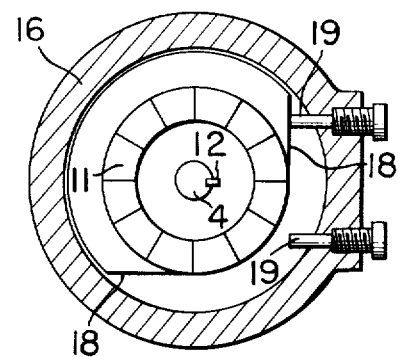
FIG. 3 is a sectional view taken along the line III—III in FIG. 1.

The valve rod 4 is so arranged as to rotate the rotary valve plug 2 between its full open and full close positions. In order to restrict the rotation of the valve rod and, consequently, the rotation of the rotary valve plug to a predetermind rotating angle (90°, in the example as shown in the drawings), the driven member 11 fixed on the valve rod 4 is formed with limiting surfaces 18 which are arranged to come into engagement with a pair of stoppers 19 (see FIG. 3), respectively, threadedly supported in the cylinder 16 to stop the driven member 11 at the predetermined positions.

The driving shaft 5 is arranged to make additional rotation, for example 15°, beyond said predetermined rotating angle of the valve rod 4 in one direction or both directions after the rotation of the valve rod 4 has been stopped by either of the stoppers 19. In the above example, therefore, if the driving shaft 5 can make additional rotation of 15° in both directions beyond the rotating angle of the valve rod 4 of 90°, the resultant rotating angle of the driving shaft 5 is 120°.

Figure 2:
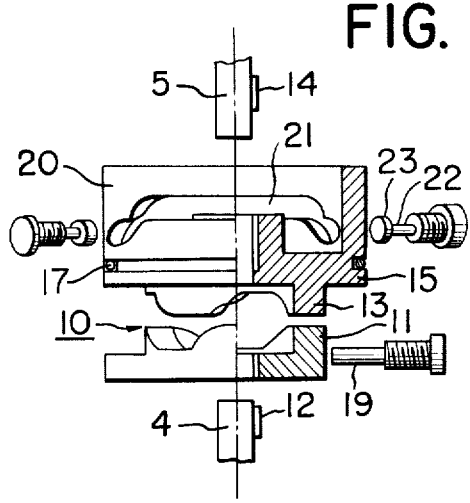
FIG. 2 is an exploded perspective view showing the valve rod, the driving shaft, the clutch and the guide mechanism.

The clutch 10 comprises a guide mechanism for guiding the driving member 13 so that it is held in engagement with the driven member 11 during a part of the rotation of the driving shaft 5 corresponding to the rotating angle of the valve rod 4 (90°, in the above example) and it is moved in axial direction along the driving shaft 5 out of engagement with said driven member 11. In the illustrated embodiment, this guide mechanism comprises guide grooves 21 formed in an extension 20 of the piston 15 integrally formed on the driving member 13 and guide pins 22 fixedly supported on the cylinder 16. As shown in FIG. 2, each guide pin 22 has a bearing 23 which engages in the guide groove 21. FIG. 4 shows the guide grooves in their developed form. The guide groove 21 includes an intermediate portion "A" and inclined portions "B" at the ends of said portion "A," as shown in FIG. 4. The portion "A" corresponds to the part of the rotation of the driving shaft 5 when the valve rod 4 is rotated, while the portion "B" corresponds to the additional rotation of the shaft 5.

A fluid circuit of fluid pressure medium is provided to transmit the axial movement of the driving member 13 to the movable valve seat 3. This fluid circuit includes a line 25 which connects a fluid chamber 24 formed above the piston 15 in the cylinder 16 to the cylinder chambers 8 to actuate the movable valve seats 3 into contact with the rotary valve plug 2, and a line 27 which connects a fluid chamber 26 formed under the piston 15 in the cylinder 16 to the cylinder chambers 9 to actuate the movable valve seats 3 out of contact with the rotary valve plug. The fluid circuit further includes a fluid pressure medium supply source 29 which is connected through a check valve to the fluid chamber 24 by means of a line 28 and also connected through another check valve to the fluid chamber 26 by means of a line 30. The fluid chamber 24 is connected through a relief valve 31 back to the supply source 29, while the fluid chamber 26 is connected through a relief valve 32 back to the supply source 29. These relief valves can be adjusted to select the contact pressure of the movable valve seats against the rotary valve plug in accordance with such factors as the level of the pressure in a fluid line for which the rotary valve is used, the hardness of the material of the movable seat, etc. If excessively high fluid pressure of the fluid pressure medium is produced in the fluid circuit, these relief valves serve to regulate and maintain the fluid medium pressure to a preselected value suitable for closing the fluid line.

Figure 4A:
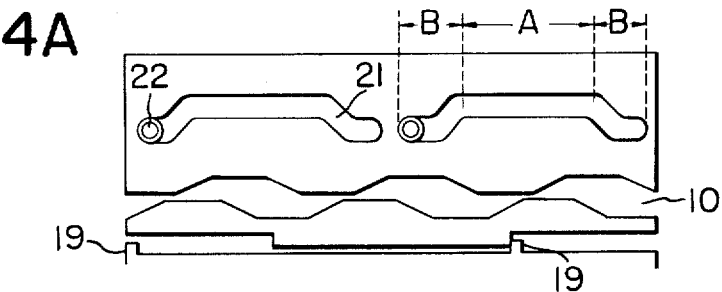
FIG. 4 (A) (B) (C) and (D) are diagrammatic views illustrating the function of the clutch.
Figure 4B:
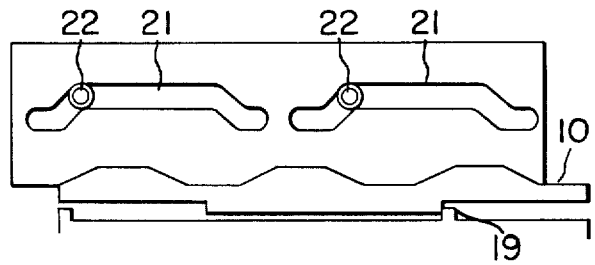
Figure 4C:
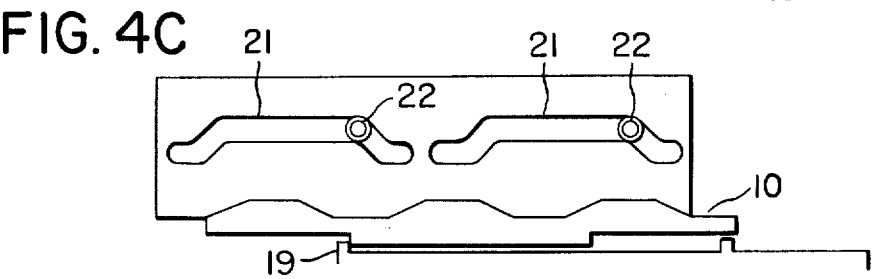
Figure 4D:
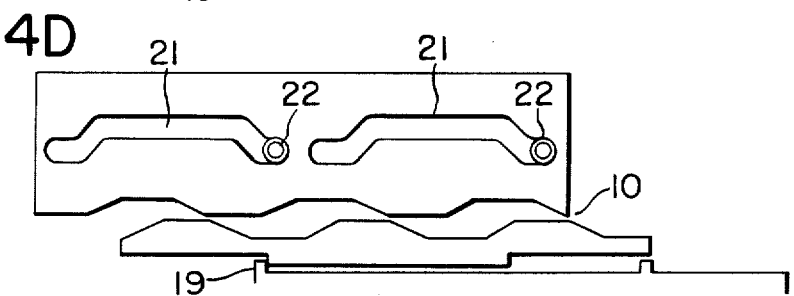

Now, the operation of the rotary valve will be explained. Assuming that the valve is closed, the piston 15 is located at its raised position and the fluid pressure medium is supplied to the cylinder chamber 8 through the line 25 to urge the movable valve seat 3 against the rotary valve plug 2. At this stage the driving member 13 of the clutch is disengaged from the driven member 11, as shown in FIG. 4(A). If the manual operating lever 6 is rotated in the valve opening direction, the piston 15 with the driving member 13 of the clutch is lowered, while rotating, by the guiding action of the guide grooves 21 and the guide pins 22, during the above mentioned additional rotation (15°, in the above example). Thus the driving member 13 of the clutch comes into engagement with the driven member 11 and at the same time the piston 15 acts to pump the fluid pressure medium from the fluid chamber 26 to the cylinder chambers 9 through the line 27, thereby moving the movable seats 3 away from the valve plug 2. When the valve seats 3 have been completely disengaged from the valve plug, the driving member 13 comes into complete engagement with the driven member 11, as shown in FIG. 4(B). As the rotation of the manual operating lever 6 is continued, the driven member 11 is rotated until it completes its predetermined rotating angle (90°, in the above example) limited by the stoppers 19, and thus the valve is opened. The driven member 11 is stopped by engagement of one of the limiting surfaces 18 with one of the stoppers 19, as shown in FIG. 4(C). As the rotation of the lever 6 is further continued, the driving member 13 with the piston 15 makes the additional rotation as mentioned above (15°, in the above example). During this additional rotation, the driving member 13 of the clutch is moved away from the driven member 11 under the action of the guide mechanism and makes free rotation independently of the driven member 11. The piston 15 is moved upward, so that the fluid pressure medium is conducted from the chamber 24 into the cylinder chambers 8 while the fluid medium in the cylinder chambers 9 is returned into the chamber 26, thereby urging the movable seat rings 3 against the rotary valve plug.

Figure 5:
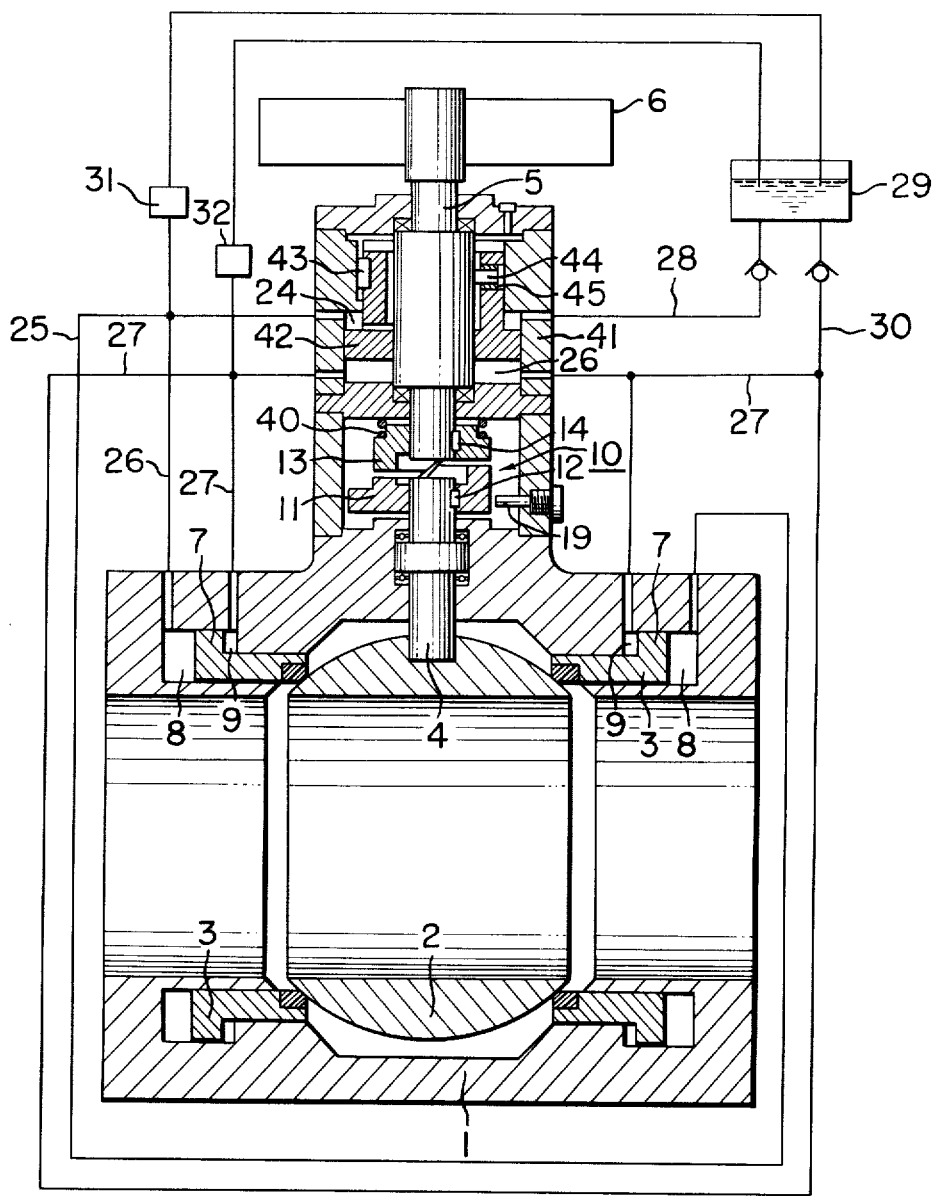
FIG. 5 is a sectional view similar to FIG. 1, illustrating another embodiment of the present invention.

FIG. 5 shows a modified embodiment of the rotary valve according to the present invention. In FIG. 5, like parts are identified by like numerals and the detailed description of these parts has been omitted. This embodiment includes a valve casing 1, a rotary valve plug 2, movable valve seats 3, a valve rod 4, a driving shaft 5, a manual operating lever 6 and a clutch 10. The clutch 10 comprises a driven member 11 fixed on the valve rod 4 by means of a key 12 and a driving member 13 slidably mounted for axial sliding movement on the driving shaft 5 by means of a key 14. These driven and driving members 11 and 13 engage with other at their inclined surfaces. The driving member 13 is resiliently biased by means of a spring 40 so that it is normally engaged with the driven member 11. The driven member 11 is limited for its rotation by means of stoppers 19, whereby the rotating angle of the valve plug 2 is defined, for example to 90°.

When the driving shaft 5 is rotated, the driving member 13 is connected to the driven member 11 while the valve plug 2 is rotated between its valve opening and closing positions, but if the driving shaft 5 is rotated beyond the rotating angle of the valve plug 2 the driving member 13 starts slipping along its inclined surface engaging with that of the driven member 11 and moves in axial direction along the driving shaft 5 against the action of said spring 40 due to the camming action of the inclined surfaces. Thus the driving member makes additional rotation after the valve plug has stopped rotation.

A cylinder 41 is arranged in coaxial relationship around the driving shaft 5 and a piston 42 is slidably fitted within said cylinder 41. The piston 42 is only movable in axial direction and is not rotatable about its axis owing to a key 43 being slidable within an axial groove formed in the upper part of the cylinder 41.

A guide mechanism is provided to move the piston 42 in axial direction in the cylinder 41 during said additional rotation of the driving member. This guide mechanism comprises a guide pin 44 and a guide groove 45 formed in an extension of the piston 42. The guide groove 45 is substantially similar to the guide groove 21 shown in FIG. 4 and includes a horizontal portion of a length corresponding to the rotating angle of the rotary valve plug 2 and inclined portions continuing from both ends of said horizontal portion, so that the piston 42 does not move in axial direction so long as the valve plug is rotating since the guide pin 44 moves along the horizontal portion of the guide groove 45, while the piston 42 makes axial movement after the valve plug has stopped rotation since the guide pin 44 moves along the inclined portion of said guide groove 45.

Fluid chambers 24 and 26 are formed above and below the piston 42, respectively, within the cylinder 41. A fluid circuit of fluid pressure medium is provided to transmit the movement of the piston 42 to the movable valve seats 3, which is substantially identical with that shown in FIG. 1.

The operation of the rotary valve as shown in FIG. 5 is substantially same as that of the rotary valve as shown in FIG. 1. When the valve is closed, the piston 42 is at its upper position and the movable seats are pressed against the valve plug 2 since the fluid pressure medium fed from the chamber 24 into the chambers 8 urge the movable seats 3 toward the valve plug. As the operating lever 6 is rotated in valve opening direction, the piston 42 is moved downward by the guide mechanism 44 and 45, so that the movable seats 3 are moved away from the valve plug 2 by the fluid pressure medium being fed into the chambers 9. Then the driving member 13 of the clutch becomes connected with the driven member 11 to start rotation of said driven member 11 thereby rotating the valve plug 2 toward the valve opening position. After the valve body has rotated to the valve opening position, the driving shaft 5 continues its rotation so that the piston 42 is moved upward by the guide mechanism 44, 45, whereby the valve seats are again moved into engagement with the valve plug by the fluid pressure medium being fed into the chambers 8 from the chamber 24.

It will be understood from the above descriptions that the present invention provides a rotary valve wherein as the valve operating shaft is rotated the valve seats are automatically disengaged from the rotary valve plug before said valve plug starts rotation to open or close the valve, that is, the valve operating shaft acts at the initial stage of its rotation to move the valve seats out of engagement with the valve plug and then start the rotation of the valve plug. Accordingly the valve operating torque required to open or close the rotary valve is substantially reduced, and it is possible to avoid the wear and/or damage of a rotary valve which may result from the rotation of the valve plug which is held in contact with the valve seats. The perfect closing of a fluid line can be easily attained by the rotary valve according to the present invention, even by the rotary valve which may be considered to hardly achieve a perfect closing of a fluid line, such as the one having especially large size or the one made of metal seats. The rotary valve according to the present invention can be advantageously used in an underground pipe line, on a bottom of a tank or in a pipe line at a remote place where maintenance or automatic operation of a valve is difficult. The clutch interposed between the driving shaft and the valve rod serves to increase the safety of the valve.

While it will be apparent that the preferred embodiments disclosed with reference to the drawings are well calculated to fulfill the objects above stated, it will be appreciated that the invention is susceptible to modification, variation and change without departing from the scope of the appended claims.

What is claimed is:

1. A rotary valve comprising:
   a valve casing,
   a rotary valve plug in said valve casing, said plug being rotatable between its valve opening position and its valve closing position,
   a movable valve seat slidably mounted in said valve casing and movable between a first position in which the valve seat is pressed into contact with the valve plug to seal it and a second position in which the valve seat is out of contact with the valve plug,
   a rotatable valve rod connected to the valve plug for rotating the valve plug between its said valve opening position and its said valve closing position,
   a driving shaft rotatably supported in said valve casing,
   an operating means at one end portion of said driving shaft,
   a clutch interposed between the valve rod and the driving shaft, said clutch comprising:
   a driven member connected to said valve rod, said driven member being rotatable about an axis through a predetermined angle to rotate the valve plug between its said valve opening position and its said valve closing position, and a driving member connected to said driving shaft, said driving member being rotatable about an axis through an angle greater than said predetermined angle so as to make an angular rotation in addition to that of said driven member, a cylinder in the valve casing, a piston disposed around said driving shaft, said piston being axially slidable in said cylinder, means for moving said piston axially in said cylinder in response to the additional angular rotation of said driving member, and a fluid circuit for transmitting the axial movement of said piston to said movable valve seat whereby the movable valve seat is normally held in its said first position and is moved to its said second position by the rotation of the driving shaft corresponding to the additional rotation of said driving member and is held in said second position when said valve plug is being rotated by the rotation of the driving shaft corresponding to the rotation of the driven member through said predetermined angle.

2. A rotary valve as claimed in claim 1, wherein:

said clutch comprises a dog clutch, said driven member is fixedly connected to said valve rod, said driving member is axially slidable on the driving shaft, said piston is integral with said driving member, means defining a guide groove in said piston, and said moving means comprises:

a guiding mechanism which includes said guide groove, and a guide pin fixed on said cylinder, said guide pin having a portion which extends into said groove.

3. A rotary valve as claimed in claim 1 wherein:

said driven member is fixedly connected to said valve rod, said driving member is axially slidable on said driving shaft and is resiliently biased against said driven member, said piston being slidably disposed in said cylinder so as to be only axially slidable therein, means defining a guide groove in said piston, and said moving means comprises:

a guiding mechanism which includes said guide groove, and a guide pin fixed on said driving shaft, said guide pin having a portion which extends into said guide groove.

4. A rotary valve as claimed in claim 1, wherein:

said movable valve seat is held in its said first position only when the valve plug is in its said valve closing position.

5. A rotary valve as claimed in claim 1, wherein:

said movable valve seat is held in its said first position when the valve plug is in its said valve opening position and when the valve plug is in its said valve closing position.

* * * * *

UNITED STATES PATENT OFFICE
CERTIFICATE OF CORRECTION

Patent No. 3,901,474  Dated August 26, 1975

Inventor(s) Yasuna Kubota

It is certified that error appears in the above-identified patent and that said Letters Patent are hereby corrected as shown below:

In the grant (ONLY) insert columns 5 through 8, as shown on the attached sheets.

Signed and Sealed this sixth Day of January 1976

[SEAL]

Attest:

RUTH C. MASON
*Attesting Officer*

C. MARSHALL DANN
*Commissioner of Patents and Trademarks* parts are identified by like numerals and the detailed description of these parts has been omitted. This embodiment includes a valve casing 1, a rotary valve plug 2, movable valve seats 3, a valve rod 4, a driving shaft 5, a manual operating lever 6 and a clutch 10. The clutch 10 comprises a driven member 11 fixed on the valve rod 4 by means of a key 12 and a driving member 13 slidably mounted for axial sliding movement on the driving shaft 5 by means of a key 14. These driven and driving members 11 and 13 engage with other at their inclined surfaces. The driving member 13 is resiliently biased by means of a spring 40 so that it is normally engaged with the driven member 11. The driven member 11 is limited for its rotation by means of stoppers 19, whereby the rotating angle of the valve plug 2 is defined, for example to 90°.

When the driving shaft 5 is rotated, the driving member 13 is connected to the driven member 11 while the valve plug 2 is rotated between its valve opening and closing positions, but if the driving shaft 5 is rotated beyond the rotating angle of the valve plug 2 the driving member 13 starts slipping along its inclined surface engaging with that of the driven member 11 and moves in axial direction along the driving shaft 5 against the action of said spring 40 due to the camming action of the inclined surfaces. Thus the driving member makes additional rotation after the valve plug has stopped rotation.

A cylinder 41 is arranged in coaxial relationship around the driving shaft 5 and a piston 42 is slidably fitted within said cylinder 41. The piston 42 is only movable in axial direction and is not rotatable about its axis owing to a key 43 being slidable within an axial groove formed in the upper part of the cylinder 41.

A guide mechanism is provided to move the piston 42 in axial direction in the cylinder 41 during said additional rotation of the driving member. This guide mechanism comprises a guide pin 44 and a guide groove 45 formed in an extension of the piston 42. The guide groove 45 is substantially similar to the guide groove 21 shown in FIG. 4 and includes a horizontal portion of a length corresponding to the rotating angle of the rotary valve plug 2 and inclined portions continuing from both ends of said horizontal portion, so that the piston 42 does not move in axial direction so long as the valve plug is rotating since the guide pin 44 moves along the horizontal portion of the guide groove 45, while the piston 42 makes axial movement after the valve plug has stopped rotation since the guide pin 44 moves along the inclined portion of said guide groove 45.

Fluid chambers 24 and 26 are formed above and below the piston 42, respectively, within the cylinder 41. A fluid circuit of fluid pressure medium is provided to transmit the movement of the piston 42 to the movable valve seats 3, which is substantially identical with that shown in FIG. 1.

The operation of the rotary valve as shown in FIG. 5 is substantially same as that of the rotary valve as shown in FIG. 1. When the valve is closed, the piston 42 is at its upper position and the movable seats are pressed against the valve plug 2 since the fluid pressure medium fed from the chamber 24 into the chambers 8 urge the movable seats 3 toward the valve plug. As the operating lever 6 is rotated in valve opening direction, the piston 42 is moved downward by the guide mechanism 44 and 45, so that the movable seats 3 are moved away from the valve plug 2 by the fluid pressure medium being fed into the chambers 9. Then the driving member 13 of the clutch becomes connected with the driven member 11 to start rotation of said driven member 11 thereby rotating the valve plug 2 toward the valve opening position. After the valve body has rotated to the valve opening position, the driving shaft 5 continues its rotation so that the piston 42 is moved upward by the guide mechanism 44, 45, whereby the valve seats are again moved into engagement with the valve plug by the fluid pressure medium being fed into the chambers 8 from the chamber 24.

It will be understood from the above descriptions that the present invention provides a rotary valve wherein as the valve operating shaft is rotated the valve seats are automatically disengaged from the rotary valve plug before said valve plug starts rotation to open or close the valve, that is, the valve operating shaft acts at the initial stage of its rotation to move the valve seats out of engagement with the valve plug and then start the rotation of the valve plug. Accordingly the valve operating torque required to open or close the rotary valve is substantially reduced, and it is possible to avoid the wear and/or damage of a rotary valve which may result from the rotation of the valve plug which is held in contact with the valve seats. The perfect closing of a fluid line can be easily attained by the rotary valve according to the present invention, even by the rotary valve which may be considered to hardly achieve a perfect closing of a fluid line, such as the one having especially large size or the one made of metal seats. The rotary valve according to the present invention can be advantageously used in an underground pipe line, on a bottom of a tank or in a pipe line at a remote place where maintenance or automatic operation of a valve is difficult. The clutch interposed between the driving shaft and the valve rod serves to increase the safety of the valve.

While it will be apparent that the preferred embodiments disclosed with reference to the drawings are well calculated to fullfil the objects above stated, it will be appreciated that the invention is susceptible to modification, variation and change without departing from the scope of the appended claims.

What is claimed is:

1. A rotary valve comprising:

a valve casing, a rotary valve plug in said valve casing, said plug being rotatable between its valve opening position and its valve closing position, a movable valve seat slidably mounted in said valve casing and movable between a first position in which the valve seat is pressed into contact with the valve plug to seal it and a second position in which the valve seat is out of contact with the valve plug, a rotatable valve rod connected to the valve plug for rotating the valve plug between its said valve opening position and its said valve closing position, a driving shaft rotatably supported in said valve casing.

an operating means at one end portion of said driving shaft, a clutch interposed between the valve rod and the driving shaft, said clutch comprising:

a driven member connected to said valve rod, said driven member being rotatable about an axis through a predetermined angle to rotate the valve plug between its said valve opening position and its said valve closing position, and a driving member connected to said driving shaft, said driving member being rotatable about an axis through an angle greater than said predetermined angle so as to make an angular rotation in addition to that of said driven member, a cylinder in the valve casing, a piston disposed around said driving shaft, said piston being axially slidable in said cylinder, means for moving said piston axially in said cylinder in response to the additional angular rotation of said driving member, and a fluid circuit for transmitting the axial movement of said piston to said movable valve seat whereby the movable valve seat is normally held in its said first position and is moved to its said second position by the rotation of the driving shaft corresponding to the additional rotation of said driving member and is held in said second position when said valve plug is being rotated by the rotation of the driving shaft corresponding to the rotation of the driven member through said predetermined angle.

2. A rotary valve as claimed in claim 1, wherein:
said clutch comprises a dog clutch,
said driven member is fixedly connected to said valve rod,
said driving member is axially slidable on the driving shaft,
said piston is integral with said driving member,
means defining a guide groove in said piston, and
said moving means comprises:
- a guiding mechanism which includes said guide groove, and
- a guide pin fixed on said cylinder, said guide pin having a portion which extends into said groove.

3. A rotary valve as claimed in claim 1 wherein:
said driven member is fixedly connected to said valve rod,
said driving member is axially slidable on said driving shaft and is resiliently biased against said driven member,
said piston being slidably disposed in said cylinder so as to be only axially slidable therein,
means defining a guide groove in said piston, and
said moving means comprises:
- a guiding mechanism which includes said guide groove, and
- a guide pin fixed on said driving shaft, said guide pin having a portion which extends into said guide groove.

4. A rotary valve as claimed in claim 1, wherein:
said movable valve seat is held in its said first position only when the valve plug is in its said valve closing position.

5. A rotary valve as claimed in claim 1, wherein:
said movable valve seat is held in its said first position when the valve plug is in its said valve opening position and when the valve plug is in its said valve closing position.

* * * * *